United States Patent
Keller et al.

(10) Patent No.: US 10,589,618 B1
(45) Date of Patent: Mar. 17, 2020

(54) COOLING PUMP ASSEMBLY AND COOLING SYSTEM FOR UTILITY VEHICLE

(71) Applicant: Hydro-Gear Limited Partnership, Sullivan, IL (US)

(72) Inventors: Scott W. Keller, Charleston, IL (US); Donald Rousser, Sullivan, IL (US)

(73) Assignee: Hydro-Gear Limited Partnership, Sullivan, IL (US)

( * ) Notice: Subject to any disclaimer, the term of this patent is extended or adjusted under 35 U.S.C. 154(b) by 69 days.

(21) Appl. No.: 15/837,838

(22) Filed: Dec. 11, 2017

Related U.S. Application Data

(62) Division of application No. 15/160,331, filed on May 20, 2016, now Pat. No. 9,840,143.

(60) Provisional application No. 62/164,294, filed on May 20, 2015.

(51) Int. Cl.
| | |
|---|---|
| *B60K 11/02* | (2006.01) |
| *B60K 8/00* | (2006.01) |
| *F01P 5/12* | (2006.01) |
| *A01D 34/412* | (2006.01) |
| *F15B 11/17* | (2006.01) |

(52) U.S. Cl.
CPC ............ *B60K 11/02* (2013.01); *A01D 34/412* (2013.01); *B60K 8/00* (2013.01); *F01P 5/12* (2013.01); *F15B 11/17* (2013.01); *F15B 2211/2053* (2013.01); *F15B 2211/20576* (2013.01); *F15B 2211/7058* (2013.01)

(58) Field of Classification Search
CPC .......... F15B 11/17; A01D 34/412; F01P 5/12; B60K 11/02; B60K 8/00; F04B 1/22
See application file for complete search history.

(56) References Cited

U.S. PATENT DOCUMENTS

| | | | |
|---|---|---|---|
| 4,278,928 | A | 7/1981 | Griffiths et al. |
| 4,427,150 | A | 1/1984 | Van Basshuysen et al. |
| 4,815,550 | A | 3/1989 | Mather et al. |
| 4,906,166 | A | 3/1990 | Seidel |
| 4,949,805 | A | 8/1990 | Mather et al. |
| 4,971,525 | A | 11/1990 | Nakayoshi et al. |
| 5,127,485 | A | 7/1992 | Wakuta et al. |
| 5,372,213 | A | 12/1994 | Hasebe et al. |
| 5,474,428 | A | 12/1995 | Kimura et al. |
| 5,713,427 | A | 2/1998 | Lutz et al. |

(Continued)

FOREIGN PATENT DOCUMENTS

| | | |
|---|---|---|
| WO | WO2012092344 | 5/2012 |
| WO | WO2013026062 | 2/2013 |
| WO | WO2015186414 | 12/2015 |

OTHER PUBLICATIONS

U.S. Appl. No. 14/867,911, filed Sep. 28, 2015.

(Continued)

*Primary Examiner* — Abiy Teka
(74) *Attorney, Agent, or Firm* — Neal, Gerber & Eisenberg LLP

(57) ABSTRACT

A coolant pump assembly having a combined hydraulic drive pump and a coolant circulating pump is disclosed herein, for use in connection with a utility vehicle, such as a ride-on or stand-on mower. Such a vehicle includes at least one combination pump assembly that utilizes a first fluid circuit to hydraulically drive a wheel of the vehicle and a second fluid circuit to cool one or more vehicle components.

21 Claims, 10 Drawing Sheets

(56) References Cited

U.S. PATENT DOCUMENTS

| | | |
|---|---|---|
| 5,775,583 A | 7/1998 | Braatz et al. |
| 5,952,746 A | 9/1999 | Mittmann et al. |
| 6,332,393 B1 | 12/2001 | Trimble |
| 6,356,448 B1 | 3/2002 | DiBene, II et al. |
| 6,394,210 B2 | 5/2002 | Matsuda et al. |
| 6,450,275 B1 | 9/2002 | Gabriel et al. |
| 6,487,856 B1 | 12/2002 | Ohashi et al. |
| 6,494,686 B1 | 12/2002 | Ward |
| 6,527,074 B1 | 3/2003 | Morishita |
| 6,568,494 B2 | 5/2003 | Takahashi |
| 6,591,806 B2 | 7/2003 | Asano et al. |
| 6,651,761 B1 | 11/2003 | Hrovat et al. |
| 6,672,843 B1 | 1/2004 | Holder et al. |
| 6,705,840 B1 | 3/2004 | Hauser et al. |
| 6,777,837 B2 | 8/2004 | Tsuzuki et al. |
| 6,811,509 B1 | 11/2004 | Langenfeld et al. |
| 6,991,058 B2 | 1/2006 | Cousin et al. |
| 7,017,693 B2 | 3/2006 | Omote et al. |
| 7,082,759 B1 | 8/2006 | Tsukamoto et al. |
| 7,083,014 B2 | 8/2006 | Forster |
| 7,131,825 B2 | 11/2006 | Wos |
| 7,156,195 B2 | 1/2007 | Yamagishi et al. |
| 7,160,086 B2 | 1/2007 | Maceyka et al. |
| 7,257,948 B1 | 8/2007 | Bennett |
| 7,282,875 B2 | 10/2007 | Lindsey |
| 7,311,184 B2 | 12/2007 | Patridge |
| 7,383,913 B1 | 6/2008 | Tsukamoto et al. |
| 7,392,654 B1 | 7/2008 | Hauser et al. |
| 7,421,928 B2 | 9/2008 | Klaus et al. |
| 7,485,979 B1 | 2/2009 | Staalesen |
| 7,500,361 B2 | 3/2009 | Ohashi |
| 7,509,929 B2 | 3/2009 | Kurple |
| 7,520,346 B2 | 4/2009 | Tate et al. |
| 7,614,227 B2 | 11/2009 | Carlson et al. |
| 7,669,414 B2 | 3/2010 | Loeffler |
| 7,677,038 B2 | 3/2010 | Ohashi et al. |
| 7,695,252 B2 | 4/2010 | Sakikawa |
| 7,726,126 B1 | 6/2010 | Hauser et al. |
| 7,729,118 B2 | 6/2010 | Lai et al. |
| 7,870,915 B2 | 1/2011 | Beeson et al. |
| 7,971,632 B2 | 7/2011 | Eriksen |
| 8,028,671 B1 | 10/2011 | Grozich |
| 8,055,399 B2 | 11/2011 | Wyatt et al. |
| 8,066,492 B2 | 11/2011 | Rogner |
| 8,080,909 B2 | 12/2011 | Perkins |
| 8,143,754 B2 | 3/2012 | Berger et al. |
| 8,169,110 B2 | 5/2012 | Swales et al. |
| 8,191,342 B2 | 6/2012 | Ishii et al. |
| 8,220,257 B2 | 7/2012 | Iida et al. |
| 8,227,948 B1 | 7/2012 | Fox et al. |
| 8,232,697 B2 | 7/2012 | Chiba et al. |
| 8,459,389 B2 | 6/2013 | Myers et al. |
| 8,487,489 B2 | 7/2013 | Palafox et al. |
| 8,499,869 B2 | 8/2013 | Cimatti et al. |
| 8,615,976 B1 | 12/2013 | Hauser et al. |
| 8,807,114 B2 | 8/2014 | Itakura |
| 8,887,500 B2 | 11/2014 | Kanenobu et al. |
| 9,074,670 B1 | 7/2015 | Bonny |
| 9,080,293 B2 | 7/2015 | Graner et al. |
| 9,114,798 B1 | 8/2015 | Fox et al. |
| 9,115,720 B2 | 8/2015 | Rosinski et al. |
| 9,115,794 B2 | 8/2015 | Vanderzyden et al. |
| 9,168,670 B2 | 10/2015 | Bergquist et al. |
| 9,187,880 B2 | 11/2015 | Tsuruga et al. |
| 9,190,887 B2 | 11/2015 | Ito et al. |
| 9,197,115 B2 | 11/2015 | Kubes et al. |
| 9,499,199 B1 | 11/2016 | Laymon et al. |
| 9,649,909 B2 | 5/2017 | Enomoto et al. |
| 9,840,143 B1 | 12/2017 | Keller et al. |
| 9,855,833 B2 | 1/2018 | Gale et al. |
| 9,867,331 B1 | 1/2018 | Siudyla et al. |
| 9,868,343 B2 | 1/2018 | Uranaka et al. |
| 9,896,822 B2 | 2/2018 | Kohno et al. |
| 9,906,172 B2 | 2/2018 | Ross |
| 2004/0045749 A1 | 3/2004 | Jaura et al. |
| 2006/0042839 A1 | 3/2006 | Iwaki et al. |
| 2006/0090639 A1* | 5/2006 | Dong .................. F04B 1/2064 91/505 |
| 2006/0191725 A1 | 8/2006 | Irikura |
| 2007/0028610 A1 | 2/2007 | Yasuda et al. |
| 2007/0144169 A1 | 6/2007 | Ohashi et al. |
| 2008/0023252 A1 | 1/2008 | Thoresen |
| 2008/0053736 A1 | 3/2008 | Yasuda et al. |
| 2008/0115488 A1 | 5/2008 | Iida et al. |
| 2009/0148310 A1 | 6/2009 | Satake |
| 2010/0236235 A1 | 9/2010 | Hardzinski et al. |
| 2011/0162355 A1 | 7/2011 | Hardzinski |
| 2012/0161554 A1 | 6/2012 | Ghelardi et al. |
| 2013/0043747 A1 | 2/2013 | Kubes |
| 2013/0098011 A1 | 4/2013 | Knussman et al. |
| 2013/0098013 A1 | 4/2013 | Edler et al. |
| 2013/0111893 A1 | 5/2013 | Edward |
| 2013/0269456 A1 | 10/2013 | Jones |
| 2014/0096641 A1 | 4/2014 | Hoshinoya et al. |
| 2014/0097043 A1 | 4/2014 | Hoshinoya et al. |
| 2015/0059328 A1 | 3/2015 | Suzuki et al. |
| 2015/0064030 A1 | 3/2015 | Suzuki et al. |
| 2015/0132163 A1 | 5/2015 | Wright et al. |
| 2015/0246607 A1 | 9/2015 | Matsuda |
| 2015/0275445 A1 | 10/2015 | Lucas et al. |
| 2015/0333379 A1 | 11/2015 | Janarthanam et al. |
| 2016/0052379 A1 | 2/2016 | Inoue et al. |
| 2016/0238004 A1 | 8/2016 | Charwot et al. |
| 2016/0363209 A1 | 12/2016 | Lapp et al. |
| 2017/0152929 A1 | 6/2017 | Sugimoto et al. |
| 2017/0190249 A1 | 7/2017 | Inada et al. |

OTHER PUBLICATIONS

U.S. Appl. No. 15/160,331, filed May 20, 2016.
U.S. Appl. No. 15/170,137, filed Jun. 1, 2016.
U.S. Appl. No. 15/182,869, filed Jun. 15, 2016.
U.S. Appl. No. 15/205,969, filed Jul. 8, 2016.
U.S. Appl. No. 15/274,030, filed Sep. 23, 2016.
Moroso, Installation Instructions, 63866 Heavy Duty Combination Alternator/Vacuum Pump Mount, Apr. 9, 2012, 10 pp.
U.S. Appl. No. 16/131,501, filed Sep. 14, 2018, 20 pp.
U.S. Appl. No. 16/448,426, filed Jun. 21, 2019, 53 pp.

* cited by examiner ically to zero turn radius utility vehicles having a hydraulic pump and motor drive system, and to a cooling pump assembly for use in such vehicles and in other applications.

SUMMARY OF THE INVENTION

A combined hydraulic drive pump and coolant circulating pump is disclosed herein for use in a utility vehicle, such as a ride-on or stand-on mower. Such a vehicle includes at least one combination pump assembly that utilizes a first fluid circuit to hydraulically drive a wheel of the vehicle and a second fluid circuit to cool one or more vehicle components. The combined hydraulic drive pump and coolant circulating pump may also be used in other applications.

The pump combination is driven by a single input shaft that drives a variable speed axial piston pump and an optional charge pump utilizing a first fluid circuit, and a coolant circulating pump utilizing a second fluid circuit. In another pump combination, the single input shaft also drives a hydraulic auxiliary pump that either shares the first fluid circuit or utilizes a third fluid circuit. In yet another pump combination, the single input shaft drives a planetary reduction gear set that drives a coolant circulating pump at a reduced rotation speed and utilizes a second fluid circuit. As will be shown herein, these pump combinations can be used in a variety of vehicle configurations, including traditional hydraulic pump-and-motor-driven zero turn radius vehicles and vehicles having one or more controllers, batteries, or fluid reservoirs that can benefit from or that require cooling. These single input pump combinations that serve at least two separate fluid systems can afford vehicle manufacturers with versatility and design flexibility in a compact package.

A better understanding of the objects, advantages, features, properties and relationships of the invention and its elements will be obtained from the following detailed description and accompanying drawings which set forth an illustrative embodiment that is indicative of the various ways in which the principles of the invention may be employed.

DETAILED DESCRIPTION OF THE DRAWINGS

Figure 1:
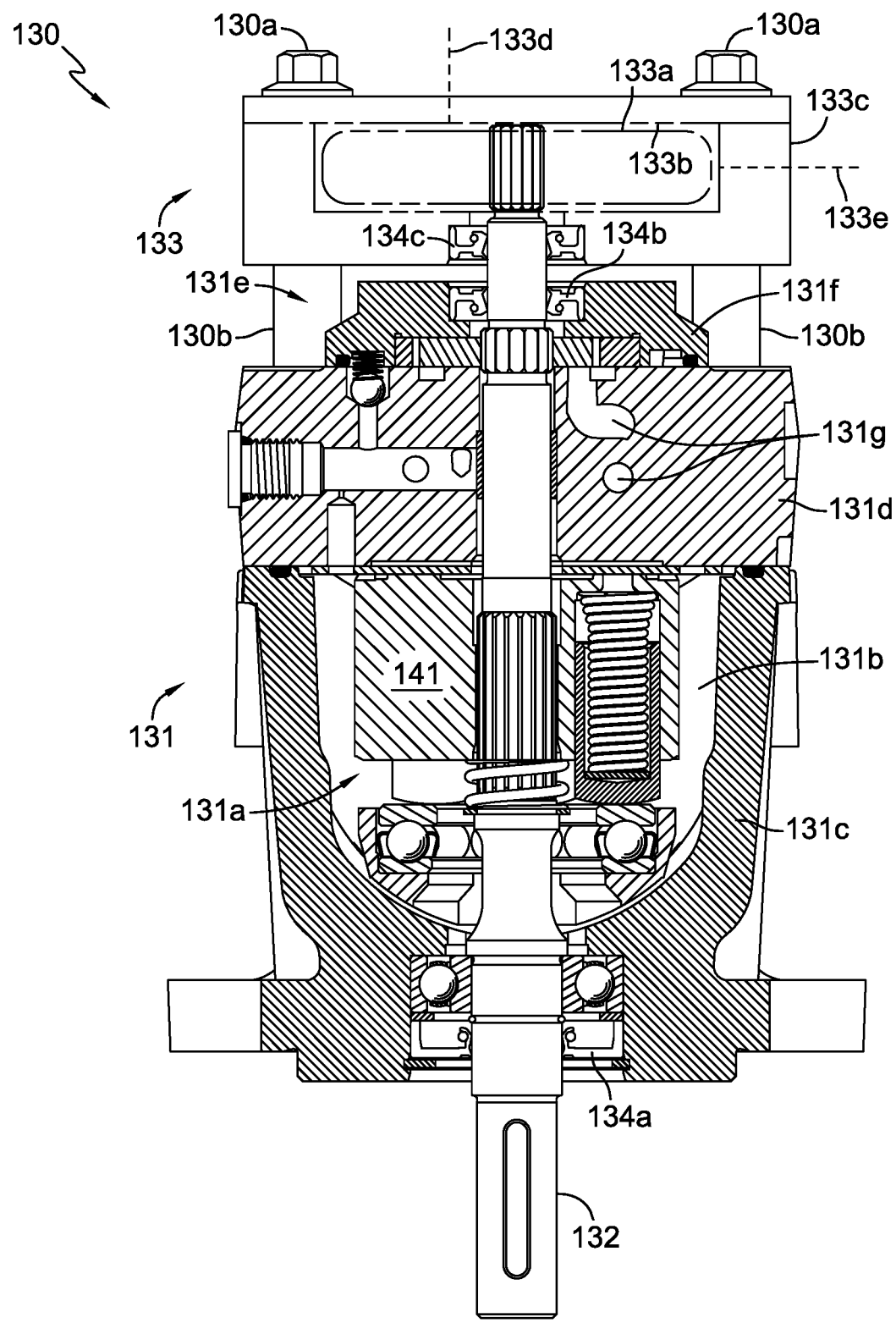
FIG. 1 is a cross-sectional, partially schematic view of a combination pump assembly in accordance with one embodiment disclosed herein.

The description that follows describes, illustrates and exemplifies one or more embodiments of the invention in accordance with its principles. This description is not provided to limit the invention to the embodiment(s) described herein, but rather to explain and teach the principles of the invention in order to enable one of ordinary skill in the art to understand these principles and, with that understanding, be able to apply them to practice not only the embodiment(s) described herein, but also any other embodiment that may come to mind in accordance with these principles. The scope of the invention is intended to cover all such embodiments that may fall within the scope of the appended claims, either literally or under the doctrine of equivalents.

It should be noted that in the description and drawings, like or substantially similar elements may be labeled with the same reference numerals. However, sometimes these elements may be labeled with differing numbers or serial numbers in cases where such labeling facilitates a more clear description. It should also be noted that the drawings set forth herein are representational and not necessarily drawn to scale, and some proportions may be exaggerated to more clearly depict certain features. Certain elements are depicted schematically, or depicted but not described in detail, where a detailed depiction or description is not necessary for a complete understanding of the disclosure by one of skill in the art. As stated above, this specification is intended to be taken as a whole and interpreted in accordance with the principles of the invention as taught herein and as understood by one of ordinary skill in the art.

FIG. 1 depicts a first embodiment of a combination pump assembly 130 comprising a variable speed hydraulic pump assembly 131 and a generically illustrated circulating pump assembly 133, both driven by a single input shaft 132. Pump assembly 131 includes axial piston pump 131*a* driven by input shaft 132. Axial piston pump 131*a* is disposed in hydraulic fluid in pump chamber 131*b* formed by joining main housing 131c and end cap 131d. Axial piston pump 131a comprises a cylinder block 141 that runs either directly on end cap 131d or on a valve plate mounted on end cap 131d, as is known in the art, and is connected to hydraulic porting 131g formed in end cap 131d. The basic construction of pump assembly 131 is known in the art, and is disclosed in commonly-owned U.S. Pat. No. 6,332,393, the terms of which are incorporated herein by reference. In each embodiment depicted herein, certain elements of the pump assemblies such as the axial pistons, swash plates and the like are depicted but not described in detail as such details are known to one of skill in the art. Furthermore, details of certain elements that are shown, such as the hydraulic porting formed in the end caps (such as end cap 131d), the hydraulic fluid circuits, coolant moving elements, and the like will be understood by those of skill in the art even though they are not depicted in their entirety and not every element forming such components is described herein.

An optional charge pump 131e runs on the opposite side of end cap 131d and is retained by charge cover 131f. Input shaft 132 extends through end cap 131d and charge cover 131f to engage a fluid moving element 133a disposed in cooling fluid in pump chamber 133b within housing 133c of circulating pump 133. Charge pump 131e is used to provide charged hydraulic fluid to the hydraulic porting 131g contained within end cap 131d and used by cylinder block 141.

Shaft seals 134a and 134b retain hydraulic fluid in pump assembly 131 and shaft seal 134c retains cooling fluid in pump chamber 133b. The separate shaft seals 134b and 134c prevent cross-contamination of hydraulic and cooling fluids. That is, shaft seals 134b and 134c ensure separation of hydraulic fluid in pump chamber 131b from cooling fluid in pump chamber 133b under normal operating conditions. A spacer structure such as stand-offs 130b is provided to help maintain a temperature differential between pump assembly 131 and circulating pump 133 and create separation between shaft seals 134b and 134c. Stand-offs 130b can either be separate components or they can be formed integrally with pump housing 133c. Fasteners 130a can extend through housing 133c, stand-offs 130b and end cap 131d to engage main housing 131c. Optionally, fasteners 130a could mount the circulating pump 133 to end cap 131d or to a bracket (not shown) mounted on end cap 131d.

Circulating pump 133 includes at least one fluid inlet 133d and one fluid outlet 133e, shown schematically in FIG. 1. These can be configured as needed depending on the design details of circulating pump 133. The size and specific design of circulating pump 133 can vary significantly based on type of coolant fluid used, viscosity, operating temperature range, duty cycle, etc. For example, the cooling fluid could be a water-based antifreeze solution as is commonly used in automotive applications. Or, it could be the same hydraulic fluid used in pump assembly 131, but flowing in a hydraulically separate cooling circuit, such as cooling circuit 160 shown in FIG. 5. Also, a variety of fluids are available for use in computer cooling systems and could be applied to cool controllers or other components in a utility vehicle. Depending on cooling system parameters and the type of cooling fluid used, fluid moving element 133a of circulating pump 133 could include an impeller or vane or it could be a gerotor-style pump similar to charge pump 131e.

Figure 2:
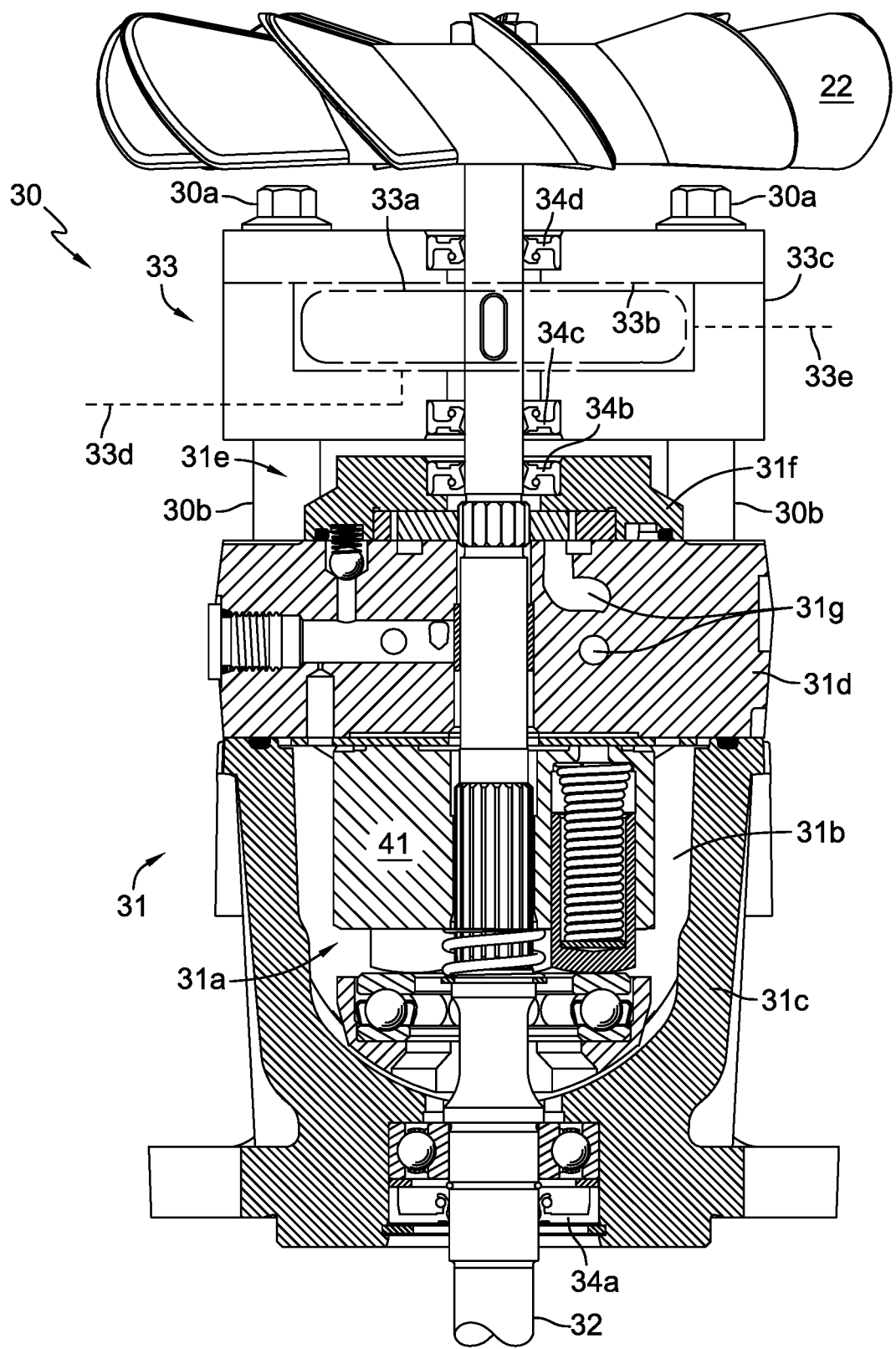
FIG. 2 is a cross-sectional, partially schematic view of a combination pump assembly in accordance with a further embodiment disclosed herein.

FIG. 2 depicts a second, alternate embodiment of a combination pump assembly 30 comprising a variable speed hydraulic pump assembly 31 having a cylinder block 41, and a generically illustrated circulating pump assembly 33, both driven by a single input shaft 32. In this embodiment, input shaft 32 extends through circulating pump assembly 33 and through additional shaft seal 34d in housing 33c to enable attachment of a fan 22 to input shaft 32. As shown, it may be desirable to position inlet 33d to the side of pump chamber 33b opposite fan 22 to keep the overall size of pump assembly 30 as small as possible and for easier routing of coolant lines away from fan 22.

Figure 3:
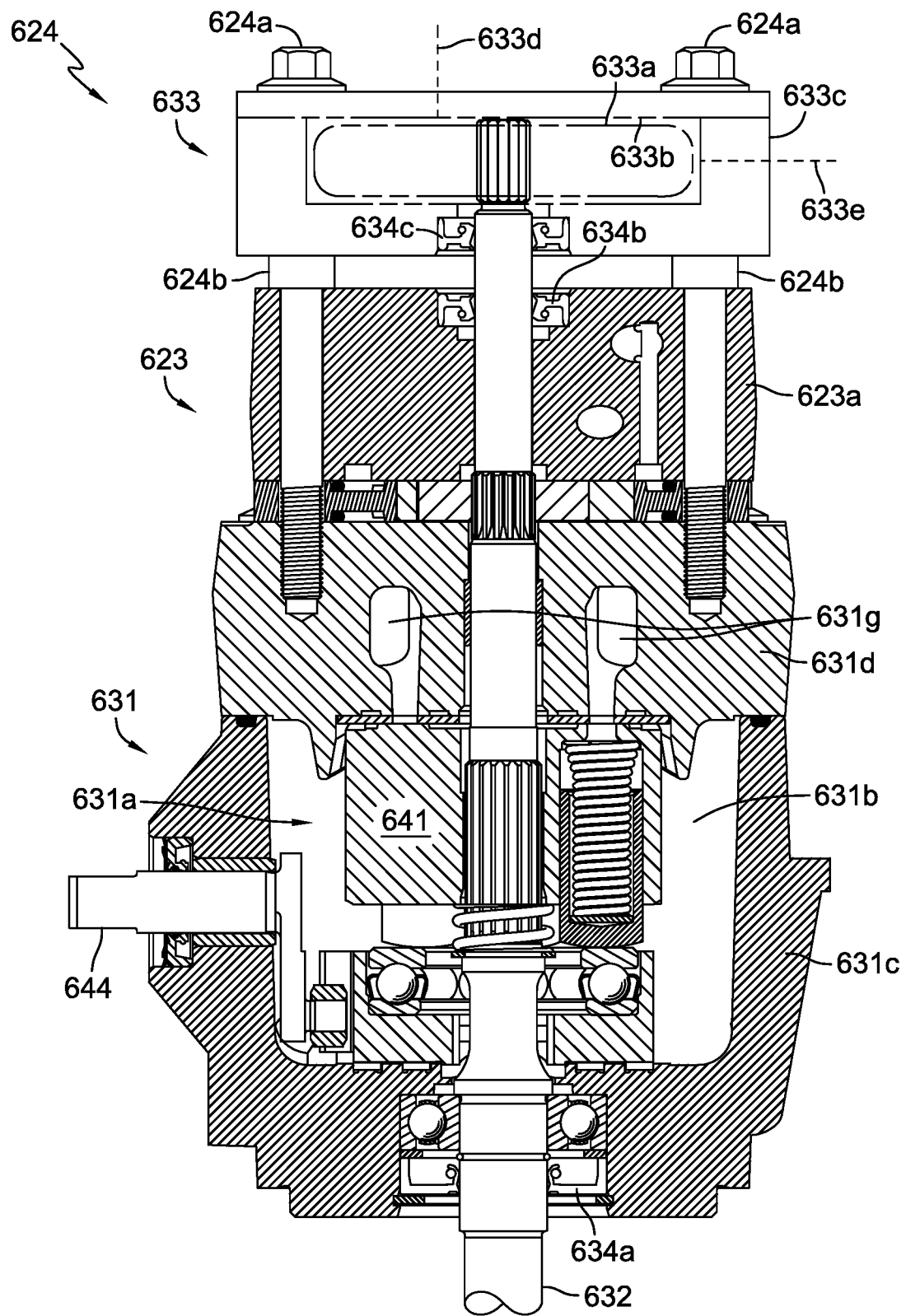
FIG. 3 is a cross-sectional, partially schematic view of a combination pump assembly in accordance with yet another embodiment disclosed herein.
Figure 4:
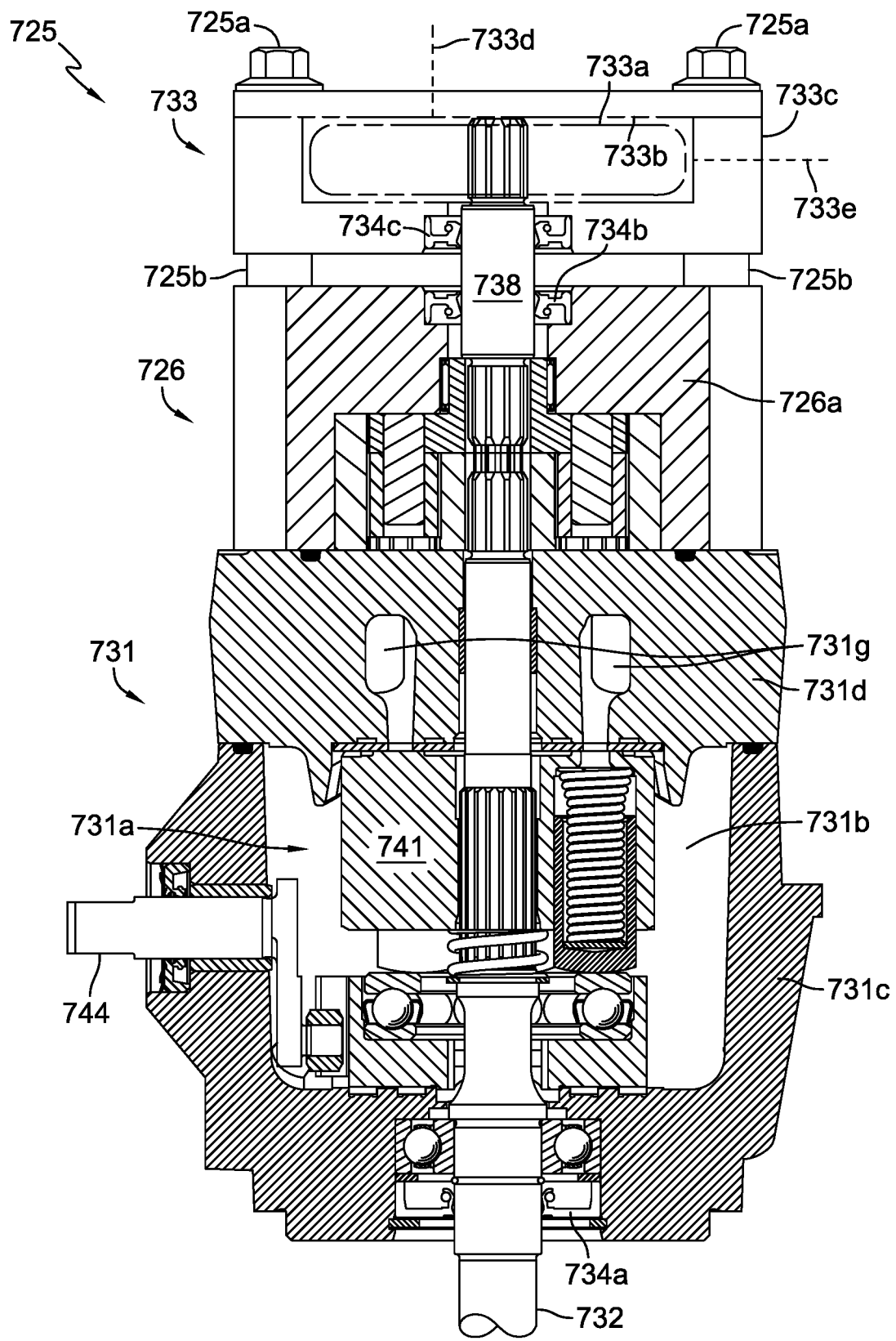
FIG. 4 is a cross-sectional, partially schematic view of a combination pump assembly in accordance with yet another embodiment disclosed herein.

FIGS. 3 and 4 depict additional alternative embodiments. It will be understood that the cross-sections of FIGS. 3 and 4 are taken at a 90 degree angle from the cross-sections of FIGS. 1 and 2, so certain elements that are shown in these latter figures, such as control arms 644 and 744, are not depicted in FIGS. 1 and 2 because they would be out of plane, and other elements, such as the hydraulic porting 31g, 131g, 631g and 731g will appear differently due to the location of the cross-section. It will also be understood that in each of these figures, certain elements are shown as not being cross-sectioned, where such would not assist in understanding the figures or the disclosure. For example, input shafts 32, 132, 632 and 732, and control arms 644 and 744, are not cross-sectioned in any of these figures. Furthermore, it will be understood that in the multiple embodiments depicted herein, elements in certain figures that are similar to elements in other figures will be given similar numbers, but with successive prefixes. Each of these elements may not be described in connection with each embodiment where doing so would not aid in understanding this disclosure.

As shown in FIG. 3, an alternative embodiment of a combination pump assembly 624 includes a hydraulic pump 631 having a cylinder block 641, an auxiliary pump 623 that includes a port block 623a, and a circulating pump 633, all driven by a single input shaft 632. Stand-offs 624b help maintain a temperature differential between auxiliary pump 623 and circulating pump 633 and create separation between shaft seals 634b and 634c. Fasteners 624a extend through housing 633c, stand-offs 624b, and port block 623a to engage end cap 631d. Shaft seals 634a and 634b retain hydraulic fluid in pump assembly 631 and auxiliary pump 623, while shaft seal 634c retains cooling fluid in pump chamber 633b.

FIG. 4 depicts another alternate embodiment of a combination pump assembly 725 comprising a planetary reduction gear set 726 interposed between a variable speed hydraulic pump assembly 731 and a generically illustrated circulating pump assembly 733, all driven by a single input shaft 732. Planetary reduction gear set 726 is mounted on end cap 731d in a gear housing 726a and is driven directly by input shaft 732, which in turn drives the circulating pump assembly 733 via planetary reduction output shaft 738. Planetary reduction gear set 726 can be sized and configured as needed for various applications. For example, while planetary reduction gear set 726 is illustrated as a single reduction planetary gear set, it could also be a double reduction planetary gear set to further reduce the rotation speed of output shaft 738. Shaft seals 734a and 734b retain hydraulic fluid in pump assembly 731 and gear set 726, while shaft seal 734c retains cooling fluid in pump chamber 733b.

Figure 5:
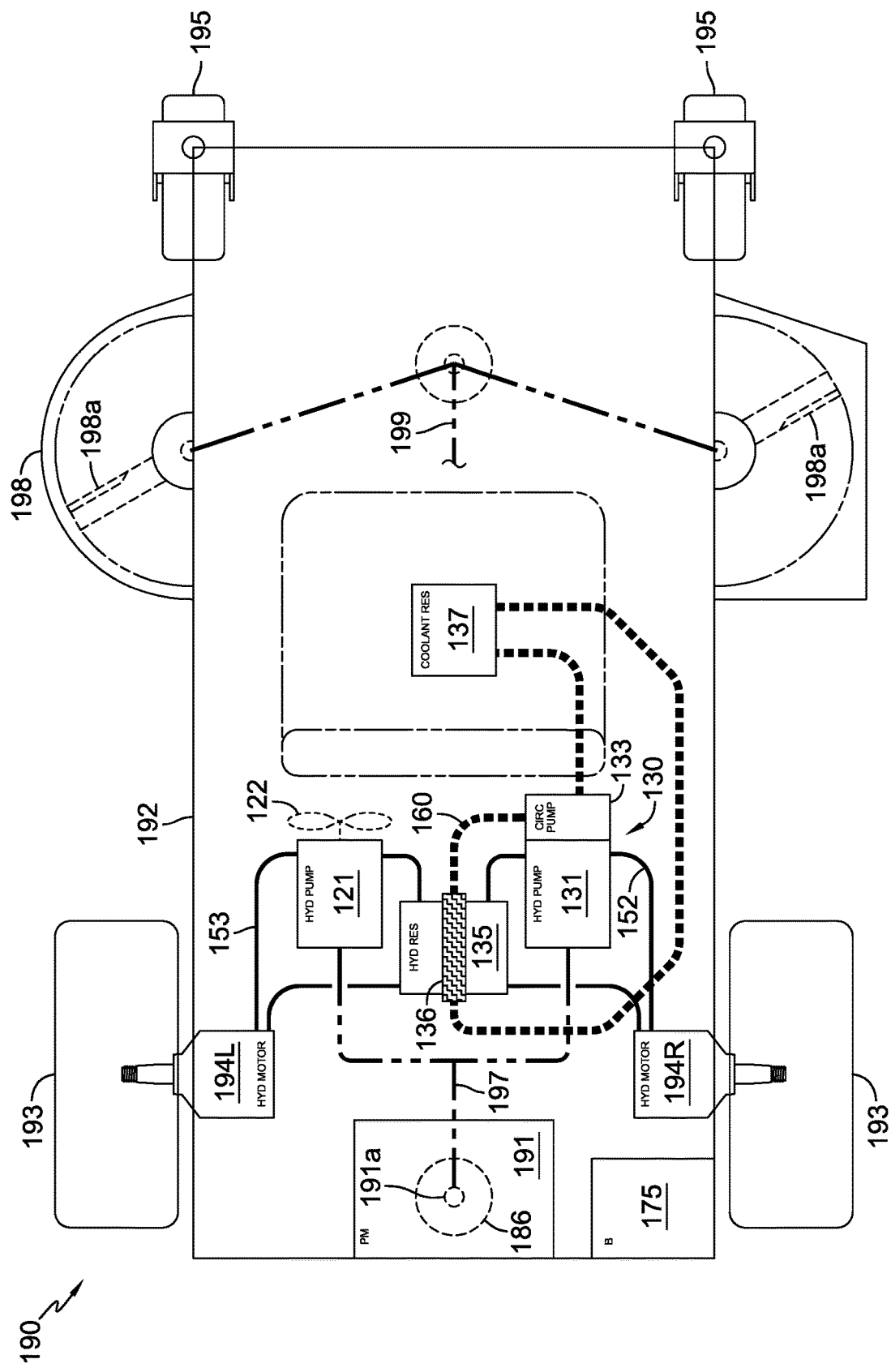
FIG. 5 is a schematic representation of a ride-on, zero turn radius vehicle using one combination pump assembly of FIG. 1 in a hydraulic drive system with a cooled reservoir.

FIG. 5 depicts a representative utility vehicle 190, in this instance a ride-on mower, having a vehicle frame 192 supported by a pair of front caster wheels 195 and a pair of rear drive wheels 193. Vehicle 190 is powered by a prime mover 191, most commonly an internal combustion engine or electric motor. By actuation of electric clutch/brake 186, the output shaft 191a of prime mover 191 selectively drives a first belt and pulley assembly 199 to power a mowing deck 198 (equipped with rotatable cutting blades 198a) that is suspended from vehicle frame 192. The output shaft 191*a* continuously drives a second belt and pulley assembly 197 engaged to a combination pump assembly 130 that includes a first variable speed hydraulic pump assembly 131. Second belt and pulley assembly 197 also is engaged to and drives a second variable speed hydraulic pump assembly 121. Hydraulic pump assemblies 121 and 131 are connected by hydraulic lines such as hydraulic lines 152, 153 to reservoir 135 and to hydraulic motors 194L, 194R, each powering a rear drive wheel 193. The combination of pump assemblies 121, 131, hydraulic lines 152, 153, reservoir 135 and hydraulic motors 194L, 194R forms a first pair of hydraulic fluid circuits sharing reservoir 135. Hydraulic drive line sets of hydraulic pump and motor drives are well known in zero turn radius vehicles and are therefore represented simply by generic lines of communication in order to improve the clarity of the vehicle schematics provided herein; e.g., a single schematic line such as hydraulic lines 152, 153 each may represent a pair of hydraulic lines. It should also be noted that hydraulic motors used in vehicles such as those generically represented herein may or may not include a hydraulic line to an external reservoir. Each of these options is represented in at least one of the vehicle figures provided. An exemplary hydraulic motor for use in connection with these embodiments is depicted in commonly-owned U.S. Pat. No. 6,811,509, the terms of which are incorporated herein by reference, or it could also be a motor such as that currently sold by Hydro-Gear of Sullivan, Ill. as the HGM-H Motor.

The coolant circulating pump 133 of combination pump assembly 130 receives cooling fluid from a second fluid circuit, namely cooling circuit 160 including reservoir 137, and pumps it through a heat exchanger 136 and back to reservoir 137. Heat exchanger 136 is used in conjunction with hydraulic reservoir 135 to cool hydraulic fluid in reservoir 135. It should be noted that the various hydraulic fluid and coolant reservoirs depicted simply as boxes in the schematic vehicle figures provided herein may also be equipped with heat exchangers when deemed necessary or desirable for a particular vehicle cooling system.

Hydraulic pump assembly 121 can optionally have a through-shaft with a fan 122 mounted thereon for additional drive system cooling, as shown. Additionally, pump assembly 30 shown in FIG. 2 can be substituted for pump assembly 130 for additional drive system cooling. A power source, such as a battery 175, supplies electrical energy to various electrical components, such as switches and indicator lights involved in vehicle control, as well as standard vehicle systems such as an ignition system, in the event the prime mover 191 is an internal combustion engine.

Figure 6:
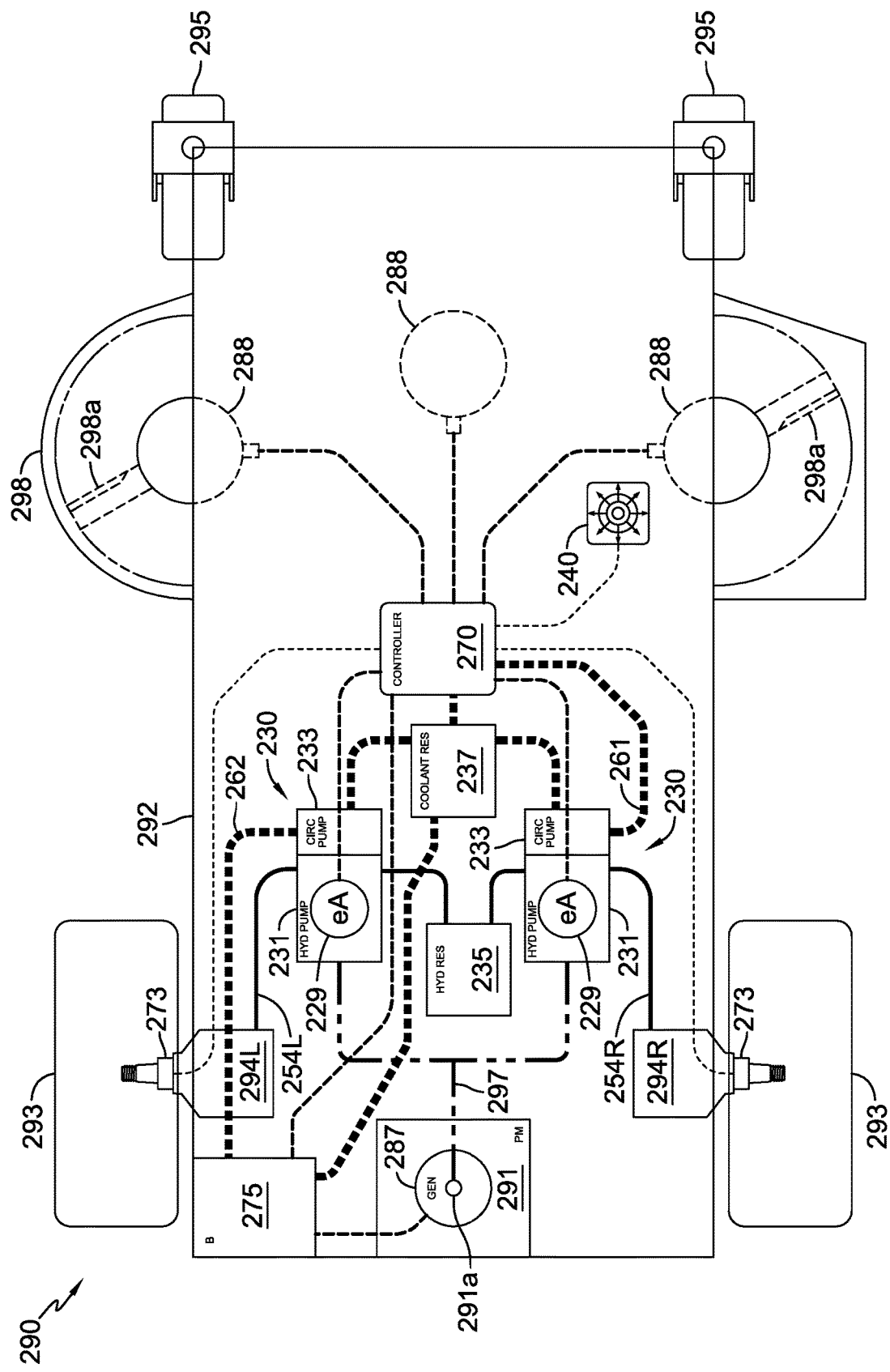
FIG. 6 is a schematic representation of a ride-on, zero turn radius vehicle using two combination pump assemblies of FIG. 1 in a hydraulic drive system with a cooled battery and a cooled controller.

FIG. 6 depicts a representative hybrid utility vehicle 290 that is also a ride-on mower similar in some aspects to utility vehicle 190. However, in vehicle 290, an output shaft 291*a* of prime mover 291 directly or indirectly drives an electric power generating device 287 to continuously maintain electrical charge in a battery 275. Electric power generating device 287 may be a generator, a high capacity alternator or the like. A mowing deck 298 is equipped with one or more rotatable cutting blades 298*a* driven by one or more electric deck motors 288. Electric deck motors 288 are selectively powered by battery 275 via controller 270. Controller 270 may control each deck motor 288 independently, and the power output to each deck motor 288 may be based on work load or other criteria. Similar electric deck motors and deck motor control systems are described in commonly-owned U.S. Pat. Nos. 8,227,948 and 8,055,399, respectively, both of which are incorporated herein by reference.

The output shaft 291*a* of prime mover 291 also continuously drives a belt and pulley assembly 297 (or other power transfer means) engaged to a pair of combination pump assemblies 230, each similar to the combination pump assembly 130 described previously herein. Hydraulic pumps 231 are connected by hydraulic lines such as lines 254R, 254L, to a first reservoir 235 and to hydraulic motors 294L, 294R, each powering a rear drive wheel 293. Again, the combination of hydraulic pumps 231, motors 294L, 294R, reservoir 235 and the various hydraulic lines such as hydraulic lines 254L, 254R form a first pair of hydraulic fluid circuits sharing reservoir 235.

Each coolant circulating pump 233 receives cooling fluid from a second reservoir 237. In this vehicle system, one of the pair of circulating pumps 233 is used to cool the battery 275 and the other circulating pump 233 is used to cool the controller 270. Reservoir 237 can include a heat exchanger component as needed, dependent on vehicle system requirements. Reservoir 237 may be constructed of a material such as aluminum and may include features such as fins to improve heat dissipation. Coolant lines 261, 262 are used to connect these various components and act with such components to form a second pair of fluid circuits (sharing reservoir 237) that is segregated from the first pair of hydraulic fluid circuits described above.

Battery 275 also supplies energy via controller 270 to a pair of electric actuators 229 that control the hydraulic pumps 231. Electric actuators 229 can be as depicted in commonly-owned U.S. Pat. No. 9,114,798, the terms of which are incorporated herein by reference. Each electric actuator 229 is independently controlled by controller 270 receiving and processing operator input from joystick 240 (or other known operator input devices, such as a steering wheel and accelerator pedal, both equipped with potentiometers or position sensors) to adjust the output of its corresponding hydraulic pump 231, thereby adjusting the rotational speed and direction of the corresponding hydraulic motor 294L, 294R and rear drive wheel 293. A speed sensor 273 monitors the rotational output of each hydraulic motor 294L, 294R at the axle to provide feedback to controller 270. As a result, the speed and steered direction of vehicle 290 is determined, including the potential execution of zero radius turns when each of the rear drive wheels 293 is driven in the opposite rotational sense.

Figure 7:
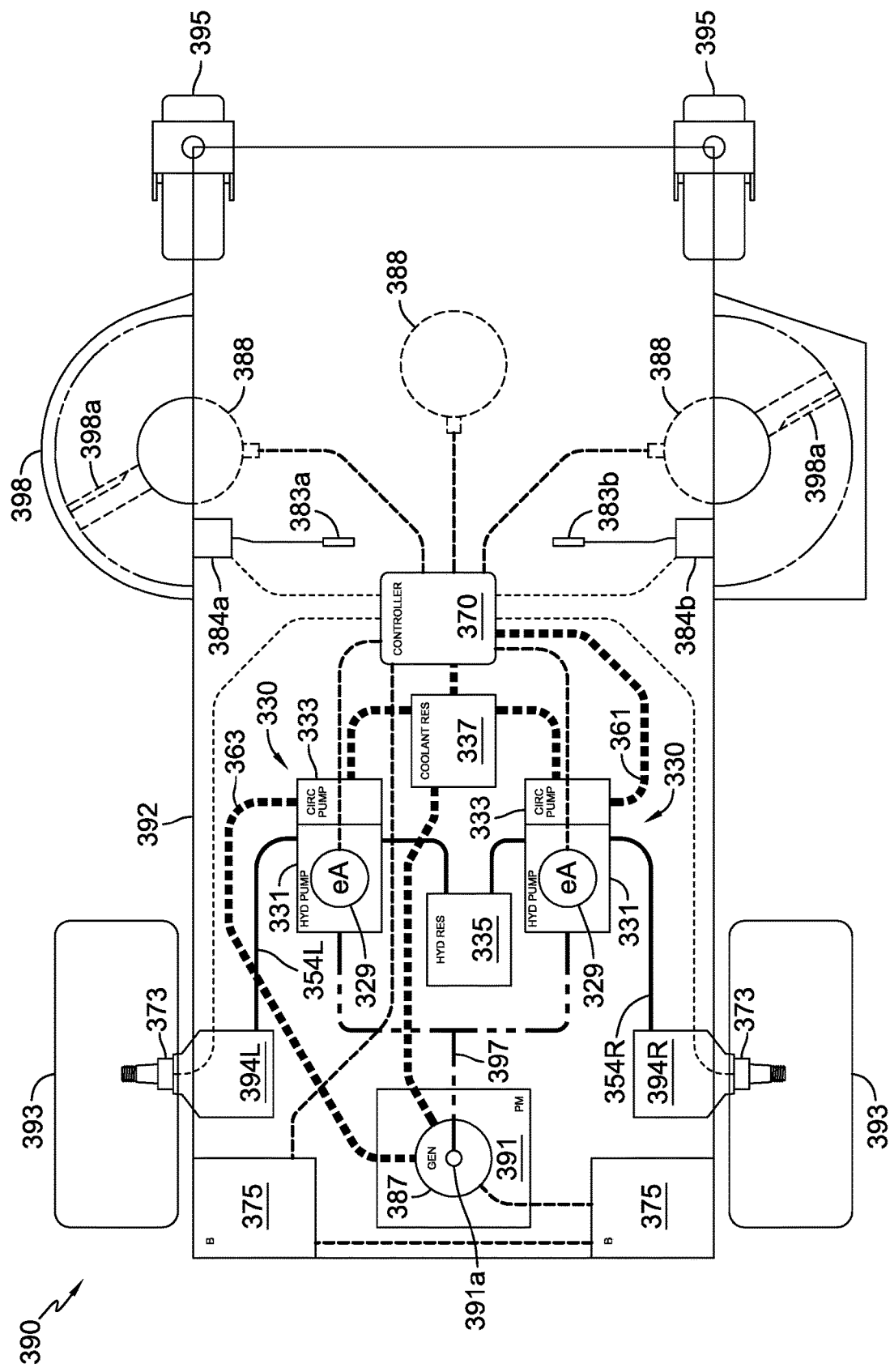
FIG. 7 is a schematic representation of a ride-on, zero turn radius vehicle using two combination pump assemblies of FIG. 1 in a hydraulic drive system with a cooled electrical power generation component and a cooled controller.

FIG. 7 depicts a representative hybrid utility vehicle 390 that is also a ride-on mower similar in many aspects to utility vehicle 290. However, in vehicle 390, rather than utilizing joystick control, a pair of operator control levers 383*a*, 383*b* imparts operator speed and steering commands to controller 370 via corresponding potentiometers or position sensors 384*a*, 384*b* respectively. Such control assemblies may include a return to neutral bias mechanism as depicted in U.S. patent application Ser. No. 14/693,255, the terms of which are incorporated herein by reference.

Similar to utility vehicle 290, vehicle 390 includes a pair of combination pump assemblies 330 that includes a pair of hydraulic pumps 331 and a pair of coolant circulating pumps 333. Hydraulic pumps 331 are connected by hydraulic lines to a first reservoir 335 (and to hydraulic motors 394L, 394R) and each coolant circulating pump 333 receives cooling fluid from a second reservoir 337. However, in this vehicle system, one of the pair of coolant circulating pumps 333 is used to cool the controller 370 and the other coolant circulating pump 333 is used to cool electric power generating device 387.

Figure 8:
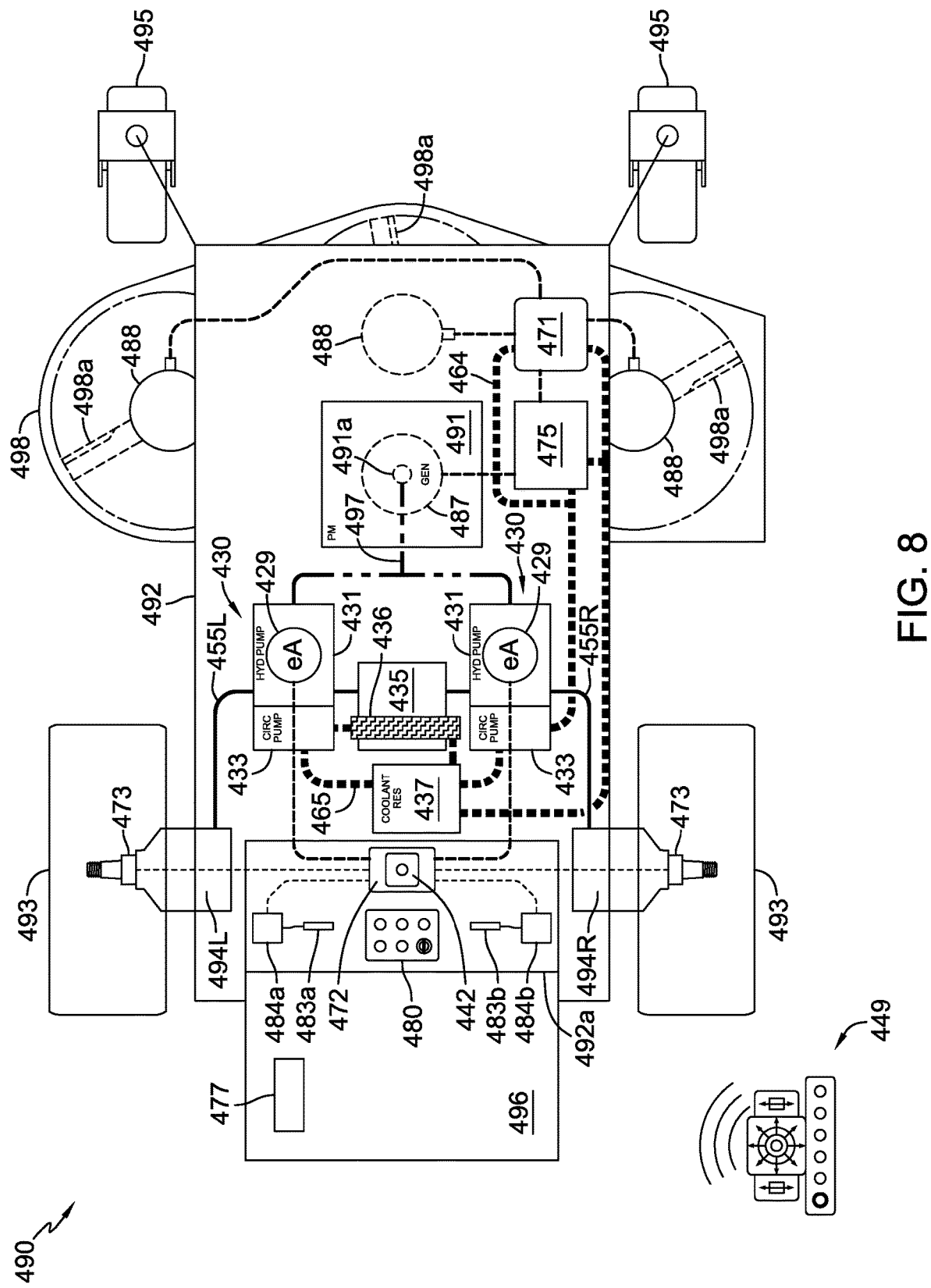
FIG. 8 is a schematic representation of a stand-on, zero turn radius vehicle using two combination pump assemblies of FIG. 1 in a hydraulic drive system with a cooled reservoir, a cooled battery, a cooled controller, and a shared coolant return line.

FIG. 8 depicts a representative hybrid utility vehicle 490 that is a stand-on mower similar in some aspects to the ride-on utility vehicles described previously herein. As illustrated, a drive controller 472, steering levers 483*a*, 483*b*, and position sensors 484*a*, 484*b* are mounted on a control support tower 492*a* fixed to vehicle frame 492. An operator platform 496 affixed to vehicle frame 492 between rear drive wheels 493 places the operator in functional proximity to the control support tower 492*a*. Operation of left-side control lever 483*a* independently determines the speed and rotational direction of the left-side drive wheel 493, while operation of right-side control lever 483*b* independently determines the speed and rotational direction of the right-side drive wheel 493. A speed sensor 473 monitors the rotational output of each hydraulic motor 494L, 494R at the axle to provide feedback to the drive controller 472. As a result, the speed and steered direction of vehicle 490 is determined, including the potential execution of zero radius turns.

A control panel 480 may contain an assortment of operator controls such as, for example, a key switch and a deck power switch. Furthermore, vehicle 490 will not start without engagement of a parking brake (not shown), or continue to run absent an activated operator presence pedal/switch 477 if mowing deck 498 is powered.

In addition to onboard controls, vehicle 490 is capable of remote operator control. A receiver 442, which may be mounted proximate to drive controller 472 on control support tower 492*a*, receives signals from an operator control transmitter 449. Receiver 442 then transmits operator inputs to the drive controller 472. One or more switches on control panel 480 permit the operator to toggle between remote and onboard operational modes. Further control details may be as depicted in U.S. patent application Ser. No. 14/925,634, the terms of which are incorporated herein by reference.

In vehicle 490, an output shaft 491*a* of prime mover 491 directly or indirectly drives an electric power generating device 487 to continuously maintain electrical charge in a battery 475. Mowing deck 498 is equipped with one or more rotatable cutting blades 498*a* driven by one or more electric deck motors 488. Electric deck motors 488 are selectively powered by battery 475 via deck motor controller 471. Controller 471 may control each deck motor 488 independently, and power output to each deck motor 488 may be based on work load or other criteria. Battery 475 also supplies energy to the drive controller 472, electric actuators 429, various sensors and switches involved in vehicle control, and standard vehicle systems e.g. an ignition system. Drive controller 472 is in CAN Bus communication with deck motor controller 471 (communication line not shown schematically to improve overall clarity). It should be noted that these two controllers 472, 471 may be contained in a single housing and may be located as needed in any suitable location on the vehicle. It should also be noted that receiver 442 may or may not be packaged or housed with drive controller 472. These two components can also be located together or separately in any suitable location on the vehicle.

The output shaft 491*a* of prime mover 491 also continuously drives a belt and pulley assembly 497 engaged to a pair of combination pump assemblies 430, each similar to the combination pump assembly 130 described previously herein. The pair of combination pumps 430 includes a pair of hydraulic pumps 431 and a pair of coolant circulating pumps 433. The output of each hydraulic pump 431 is independently controlled via communication between drive controller 472 and an electric actuator 429. Hydraulic pumps 431 are connected by hydraulic lines 455L, 455R to a first shared reservoir 435 (and to hydraulic motors 494L, 494R) and each coolant circulating pump 433 receives cooling fluid from a second shared reservoir 437. One of the pair of circulating pumps 433 pumps cooling fluid via coolant lines 465 through a heat exchanger 436 and back to reservoir 437. The other circulating pump 433 pumps cooling fluid via coolant lines 464 through battery 475 and controller 471, and a shared coolant return line (included in coolant lines 464) returns the cooling fluid to reservoir 437.

Figure 9:
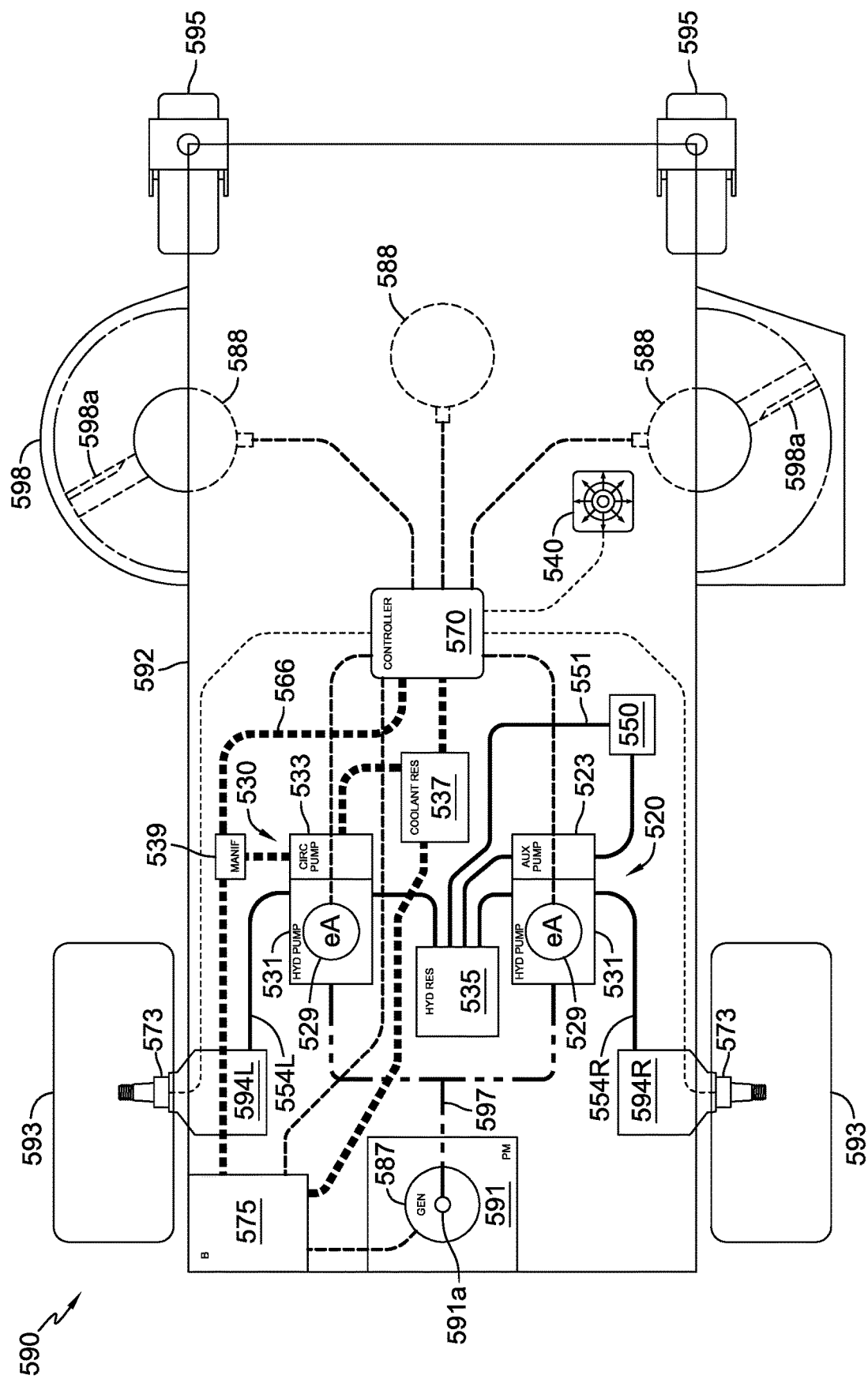
FIG. 9 is a schematic representation of a ride-on, zero turn radius vehicle using one combination pump assembly of FIG. 1 in a hydraulic drive system with a manifold, a cooled battery and a cooled controller.

FIG. 9 depicts a representative hybrid utility vehicle 590 that is a ride-on mower most similar to previously described utility vehicle 290. Similar to vehicle 290, an output shaft 591*a* of prime mover 591 directly or indirectly drives an electric power generating device 587 to continuously maintain electrical charge in a battery 575 and also continuously drives a belt and pulley assembly 597. In vehicle 590, however, belt and pulley assembly 597 is engaged to one combination pump assembly 530, similar to combination pump assembly 30 or 130 described previously herein, and one known combination hydraulic and auxiliary pump assembly 520. The basic construction of hydraulic and auxiliary pump assembly 520 is known in the art, and is also disclosed in commonly-owned U.S. Pat. No. 6,332,393. Hydraulic pumps 531 of pump assemblies 520 and 530 are connected by hydraulic lines 554L, 554R to a first reservoir 535 and to hydraulic motors 594L, 594R, each powering a rear drive wheel 593. In this vehicle system, the circulating pump 533 of pump assembly 530 receives cooling fluid from a second reservoir 537 and pumps it through a manifold 539 to cool both the battery 575 and the controller 570 via coolant lines 566. Auxiliary pump 523 of pump assembly 520 is available to power any suitable auxiliary hydraulic device 550 via coolant lines 551 of vehicle 590.

Figure 10:
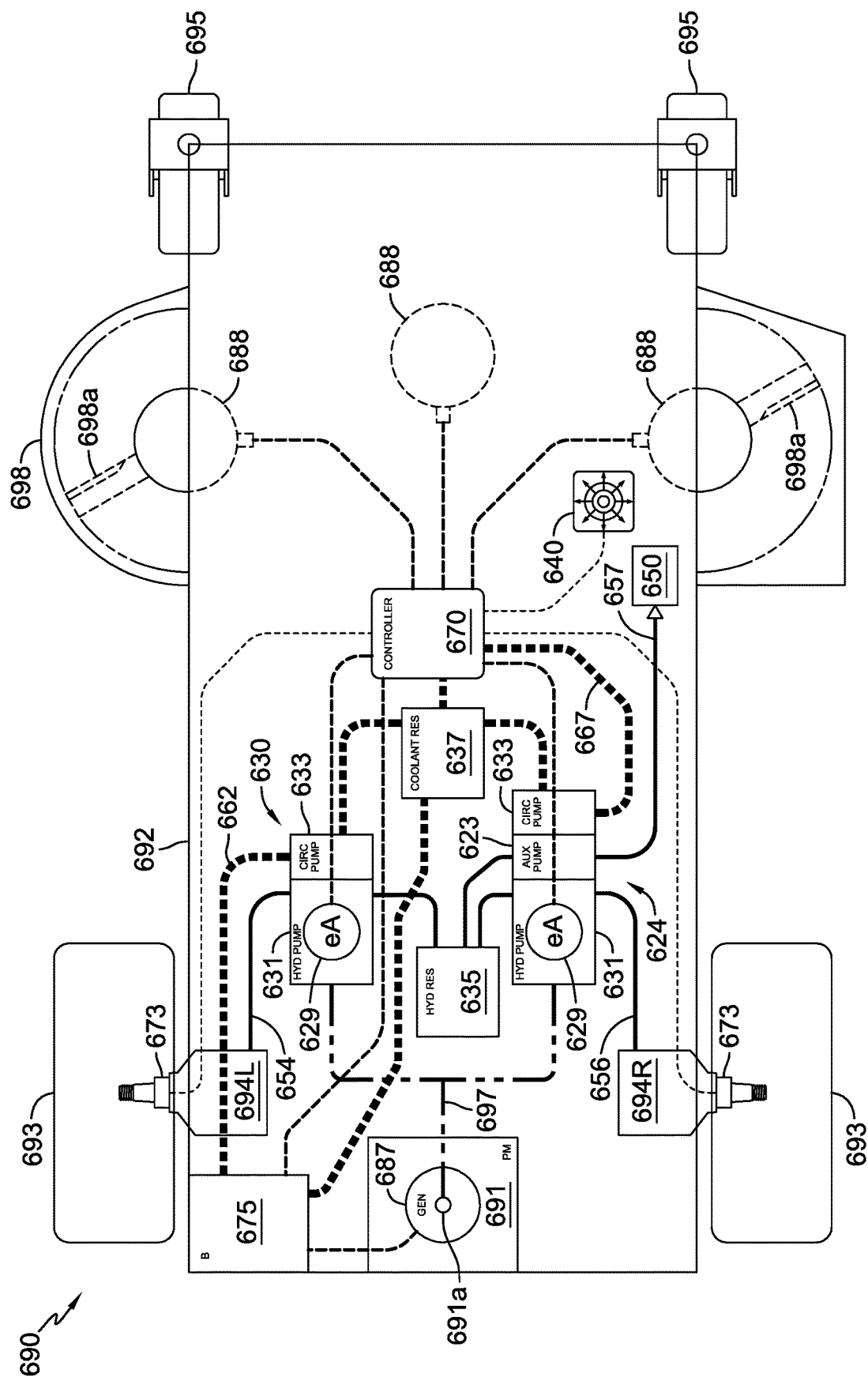
FIG. 10 is a schematic representation of a ride-on, zero turn radius vehicle using one combination pump assembly of FIG. 1, and one additional combination pump assembly of FIG. 3 in a hydraulic drive system with a cooled battery and a cooled controller.

FIG. 10 depicts a representative hybrid utility vehicle 690 that is a ride-on mower similar to utility vehicles 290 and 590, described previously herein. In vehicle 690, belt and pulley assembly 697 is engaged to one combination pump assembly 630, similar to combination pump assembly 30 or 130 described previously herein, and one combination hydraulic-auxiliary-circulating pump assembly 624 as depicted in FIG. 3.

As shown in FIG. 10, hydraulic pumps 631 of pump assemblies 624 and 630 are connected by hydraulic lines 654, 656 to a first reservoir 635 and to hydraulic motors 694L, 694R, each powering a rear drive wheel 693, and such components form a first pair of fluid circuits sharing reservoir 635. Each coolant circulating pump 633 receives cooling fluid from a second shared reservoir 637 and these components along with coolant lines 662 and 667 form a second, cooling circuit pair. Auxiliary pump 623 can either share fluid from the aforementioned first fluid circuit (i.e., hydraulic fluid from reservoir 635) with hydraulic pumps 631 or it may utilize a third fluid circuit and source (not shown). Similar to vehicle 290, one of the pair of circulating pumps 633 is used to cool the battery 675 and the other circulating pump 633 is used to cool the controller 670. Similar to vehicle 590, auxiliary pump 623 is available to power any suitable auxiliary hydraulic device 650 of vehicle 690 by means of auxiliary hydraulic line 657. The auxiliary hydraulic device 650 may include such devices as an auger, deck lift, snowblade actuator, sprayer or the like. The complete hydraulic circuit for auxiliary pump 623 is not shown in order to simplify the schematic representation of vehicle 690.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any equivalent thereof.

What is claimed is:

1. A pump assembly, comprising:
   a main housing having a first end and a second end;
   an end cap engaged to the second end of the main housing, wherein a first surface of the end cap and the main housing cooperate to form a main sump, the end cap comprising internal hydraulic porting;
   a main pump disposed on the end cap and in the main sump;
   a cooling pump housing disposed adjacent to a second surface of the end cap, opposite the first surface, and having a cooling pump disposed therein, wherein the cooling pump housing is hydraulically segregated from the main sump;
   at least one spacer structure disposed between the cooling pump housing and the second surface of the end cap, to maintain a physical separation space and to permit airflow between the cooling pump housing and the end cap; and
   an input shaft extending into the first end of the main housing and engaged to and driving the main pump, wherein the input shaft extends completely through the end cap and drives the cooling pump.

2. The pump assembly of claim 1, wherein the at least one spacer structure comprises a plurality of stand-offs that are integrally formed with the cooling pump housing.

3. The pump assembly of claim 1, wherein the main pump comprises an axial piston pump having a rotating cylinder block disposed on the end cap and in fluid communication with the internal hydraulic porting of the end cap.

4. The pump assembly of claim 3, further comprising a charge pump disposed on the second surface of the end cap and being engaged to and driven by the input shaft, wherein the charge pump is in fluid communication with the axial piston pump through the internal hydraulic porting of the end cap.

5. The pump assembly of claim 1, further comprising an auxiliary pump disposed on the second surface of the end cap and being engaged to and driven by the input shaft.

6. The pump assembly of claim 5, wherein the auxiliary pump shares hydraulic fluid with the main housing.

7. The pump assembly of claim 6, wherein the input shaft is directly engaged to and drives the cooling pump, and the input shaft has a proximal end disposed external and adjacent to the main housing and a distal end disposed external and adjacent to the cooling pump housing, and a fan is attached to the distal end of the input shaft.

8. The pump assembly of claim 1, further comprising a planetary gear reduction disposed in a gear housing mounted on the second surface of the end cap between the end cap and the cooling pump, wherein the planetary gear reduction is driven by the input shaft and drives a reduction output shaft that is engaged to and drives the cooling pump.

9. The pump assembly of claim 1, further comprising a charge pump disposed on the second surface of the end cap and being engaged to and driven by the input shaft, wherein the charge pump is in fluid communication with the main pump through the internal hydraulic porting of the end cap.

10. The pump assembly of claim 9, wherein the at least one spacer structure comprises a plurality of stand-offs, and the charge pump is disposed in the physical separation space between the cooling pump housing and the end cap.

11. The pump assembly of claim 10, wherein the plurality of stand-offs are integrally formed with the cooling pump housing.

12. A pump assembly, comprising:
    a main housing having a first end and a second end;
    an end cap engaged to the second end of the main housing, wherein a first surface of the end cap and the main housing cooperate to form a main sump;
    an axial piston pump disposed in the main sump;
    a planetary gear reduction disposed in a gear housing mounted adjacent to a second surface of the end cap;
    an input shaft extending into the first end of the main housing and engaged to and driving the axial piston pump, wherein the input shaft extends completely through the end cap and is engaged to and drives the planetary gear reduction;
    an output shaft driven by the planetary gear reduction;
    a cooling pump housing disposed adjacent to the gear housing and having a cooling pump disposed therein, wherein the cooling pump housing is hydraulically segregated from the main sump, and the cooling pump is engaged to and driven by the output shaft; and
    at least one spacer structure disposed between the cooling pump housing and the gear housing, to maintain a physical separation space and to permit airflow between the cooling pump housing and the gear housing.

13. The pump assembly of claim 12, wherein the at least one spacer structure comprises a plurality of stand-offs.

14. The pump assembly of claim 13, wherein the plurality of stand-offs are integrally formed with the cooling pump housing.

15. A pump assembly for use on a vehicle having a cooling circuit for cooling fluid, and a hydraulic motor connected to a hydraulic drive circuit for hydraulic fluid, the pump assembly comprising:
    an end cap engaged to a main pump housing, wherein a first surface of the end cap and the main pump housing cooperate to form a main sump, the end cap comprising internal hydraulic porting;
    a main pump disposed on the end cap and in the main sump, wherein the main pump may be connected to the hydraulic motor through the hydraulic drive circuit;
    a cooling pump housing disposed adjacent to a second surface of the end cap and having a cooling pump disposed therein, wherein the cooling pump housing is hydraulically segregated from the main sump and the cooling pump may be connected to the cooling circuit;
    a plurality of stand-offs disposed between the cooling pump housing and the second surface of the end cap, to maintain a physical separation space adjacent to the cooling pump housing and to permit airflow between the cooling pump housing and the end cap; and
    an input shaft extending into the main pump housing and engaged to and driving the main pump, wherein the input shaft extends completely through the end cap and drives the cooling pump.

16. The pump assembly of claim 15, further comprising a charge pump disposed on the second surface of the end cap and driven by the input shaft, wherein the charge pump is hydraulically connected to the main sump and segregated from the cooling circuit.

17. The pump assembly of claim 15, further comprising an auxiliary pump disposed on the second surface of the end cap and being engaged to and driven by the input shaft.

18. The pump assembly of claim 17, wherein the auxiliary pump shares hydraulic fluid with the main pump housing.

19. The pump assembly of claim 17, wherein the plurality of stand-offs are disposed between the auxiliary pump and the cooling pump housing, and the physical separation space is directly between the auxiliary pump and the cooling pump housing.

20. The pump assembly of claim 19, wherein the plurality of stand-offs are integrally formed with the cooling pump housing.

21. The pump assembly of claim 15, further comprising a planetary gear reduction driven by the input shaft and disposed between the second surface of the end cap and the cooling pump housing, and an output shaft driven by the planetary gear reduction to power the cooling pump.

* * * * *